US012714106B2

(12) United States Patent
Olenik et al.

(10) Patent No.: US 12,714,106 B2
(45) Date of Patent: Aug. 25, 2026

(54) **CRYSTAL FORMS OF METHYL(2R*,4R*)-4-[[(5S)-3-(3,5-DIFLUOROPHENYL)-5-VINYL-4H-ISOXAZOLE-5-CARBONYL]AMINO] TETRAHYDROFURAN-2-CARBOXYLATE AND THEIR HERBICIDAL SYNERGISTIC EFFECTS**

(71) Applicant: Bayer Aktiengesellschaft, Leverkusen (DE)

(72) Inventors: Britta Olenik, Bottrop (DE); Klaus Bernhard Haaf, Kelkheim (DE); Lothar Lorentz, Waldbroel (DE); Birgit Keil, Duesseldorf (DE); Bernd Roesler, Wuppertal (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 759 days.

(21) Appl. No.: 17/908,858

(22) PCT Filed: Mar. 16, 2021

(86) PCT No.: PCT/EP2021/056623

§ 371 (c)(1),
(2) Date: Sep. 1, 2022

(87) PCT Pub. No.: WO2021/185806

PCT Pub. Date: Sep. 23, 2021

(65) Prior Publication Data

US 2023/0104990 A1 Apr. 6, 2023

(30) Foreign Application Priority Data

Mar. 20, 2020 (EP) .................................... 20164735
May 15, 2020 (EP) .................................... 20175105

(51) Int. Cl.
*A01N 43/80* (2006.01)
*A01P 21/00* (2006.01)

(52) U.S. Cl.
CPC .............. *A01N 43/80* (2013.01); *A01P 21/00* (2021.08)

(58) Field of Classification Search
None
See application file for complete search history.

(56) References Cited

U.S. PATENT DOCUMENTS 9,078,442 B2 7/2015 Willms
9,516,880 B2 12/2016 Haaf et al.
9,585,392 B2 3/2017 Kuhn
10,104,892 B2 10/2018 Frenzel et al.
11,597,724 B2 3/2023 Peters et al.
11,613,522 B2 3/2023 Peters et al.
12,171,230 B2 12/2024 Trabold et al.
12,185,723 B2 1/2025 Van Almsick et al.
12,319,664 B2 6/2025 Bojack et al.
2021/0292312 A1 9/2021 Peters et al.
2022/0053762 A1 2/2022 Trabold et al.
2022/0386605 A1 12/2022 Lorentz et al.

FOREIGN PATENT DOCUMENTS

AU 2018285212 B2 * 6/2022 ............. A01N 25/32
WO 2014048940 A2 4/2014
WO 2018/228985 A1 12/2018
WO 2019034602 A1 2/2019

OTHER PUBLICATIONS

Morissette et al. High-throughput crystallization: polymorphs, salts, co-crystals and solvates of pharmaceutical solids, Advanced Drug Delivery Reviews, vol. 56, Issue 3, 2004. (Year: 2004).*
Pitt. Common Solvents for Crystallizaiton. Retreived from the Wayback Machine on Aug. 13, 2025, https://web.archive.org/web/20171117222705/http://ccc.chem.pitt.edu/wipf/Web/Crystallization%20Solvents.pdf. Published Nov. 17, 2017. (Year: 2017).*
Dinger, Maarten. Crystal Growing Tips. Retreived from the Internet on Aug. 13, 2025, https://xray.chem.ufl.edu/helpful-information/crystal-growing-tips/. Published Apr. 28, 2015. (Year: 2015).*
International Search Report and Written Opinion of International Application No. PCT/EP2021/056623, mailed May 4, 2021.
Colby, S.R., "Calculating Synergistic and Antagonistic Responses of Herbicide Combinations" Weeds, vol. 15, 1967, pp. 20-22.
Meier, U., "Growth stages of mono-and dicotyledonous plants" BBCH Monograph, 2. Edition, 2001, Federal Biological Research Centre for Agriculture and Forestry.
Ott, G. et al., "a,b-Cyclic-b-benzamido hydroxamic acids: Novel templates for the design, synthesis, and evaluation of selective inhibitors of TNF-a converting enzyme (TACE)" Bioorganic & Medicinal Chemistry Letters 18 (2008) 694-699.

* cited by examiner

*Primary Examiner* — Lauren Wells
(74) *Attorney, Agent, or Firm* — Paul D. Tietz; Michael Vanengelen

(57) ABSTRACT

The present invention relates to the crystal forms of methyl (2R*,4R*)-4-[[(5S)-3-(3,5-difluorophenyl)-5-vinyl-4H-isoxazole-5-carbonyl]amino]tetrahydrofuran-2-carboxylate (I) existing in the form of two stereoisomers: Methyl(2R, 4R)-4-[[(5S)-3-(3,5-difluorophenyl)-5-vinyl-4H-isoxazole-5-carbonyl]-amino]tetrahydrofuran-2-carboxylate of formula (Ia) and methyl (2S,4S)-4-[[(5S)-3-(3,5-difluorophenyl)-5-vinyl-4H-isoxazole-5-carbonyl]amino] tetrahydrofuran-2-carboxylate of formula (Ib), to a method for preparing the crystal forms, to the use for preparing stable agrochemical formulations, and to the use in the field of agriculture for controlling harmful plants.

8 Claims, 2 Drawing Sheets

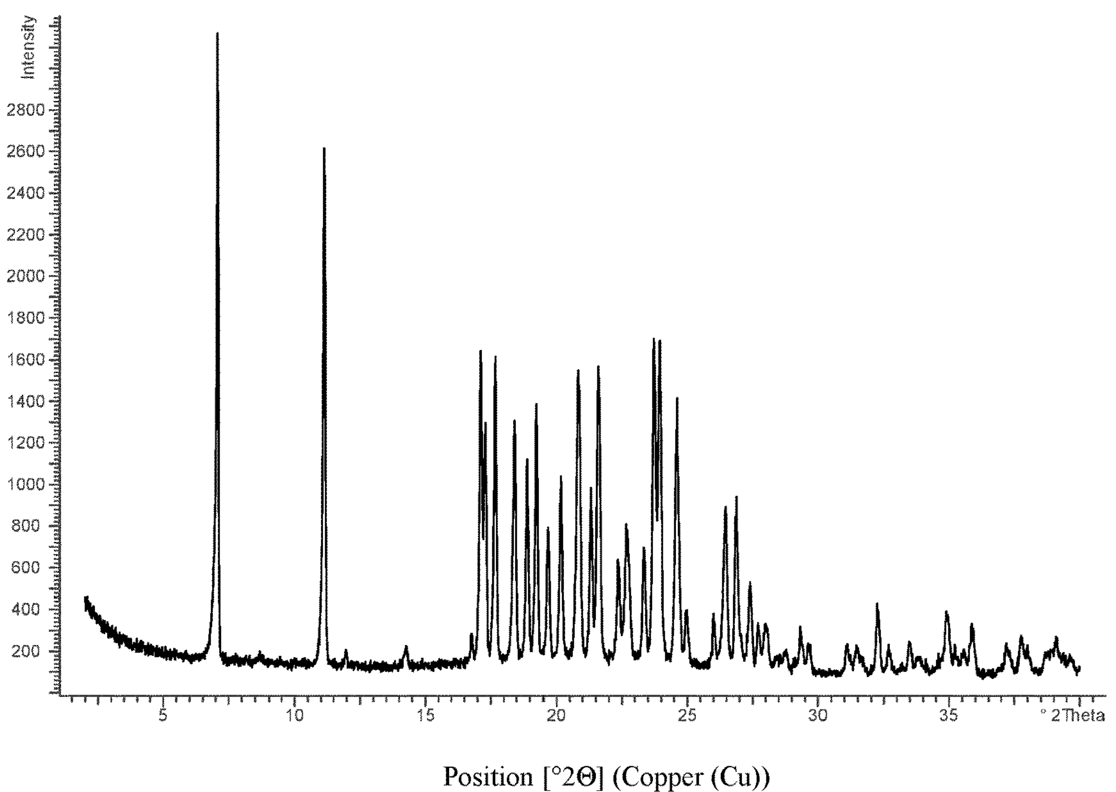
Figure 1: X-ray powder diffractogram of the crystal form of compound of formula (Ia)
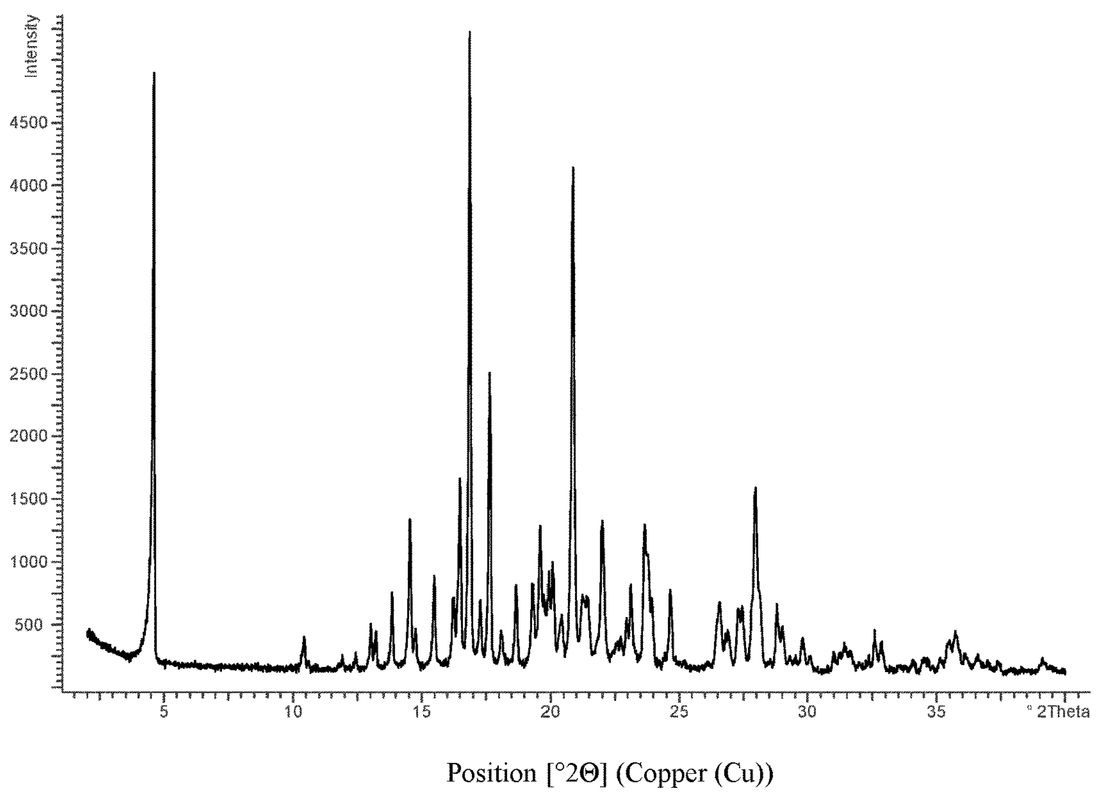
Figure 2: X-ray powder diffractogram of the crystal form of compound of formula (Ib)

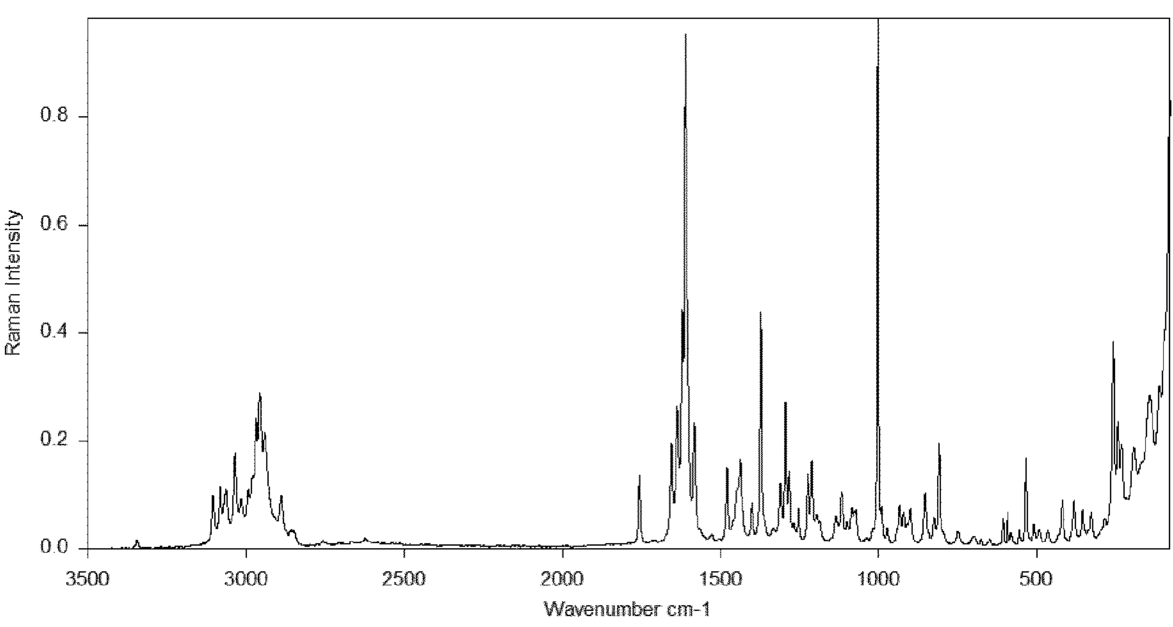
Figure 3: Raman spectrum of the crystal form of compound of formula (Ia)
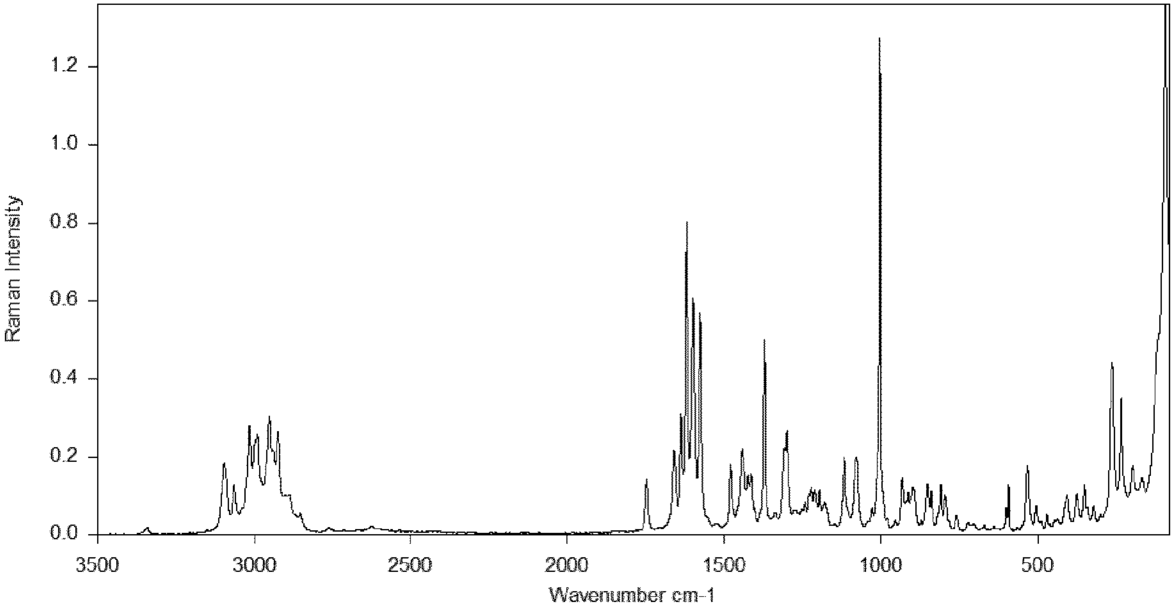
Figure 4: Raman spectrum of the crystal form of compound of formula (Ib)

CRYSTAL FORMS OF METHYL(2R*,4R*)-4-[[(5S)-3-(3,5-DIFLUOROPHENYL)-5-VINYL-4H-ISOXAZOLE-5-CARBONYL]AMINO]TETRAHYDROFURAN-2-CARBOXYLATE AND THEIR HERBICIDAL SYNERGISTIC EFFECTS

CROSS-REFERENCE TO RELATED APPLICATIONS

This application is the National Stage entry of International Application No. PCT/EP2021/056623, filed 16 Mar. 2021, which claims priority to European Patent Application No. 20164735.1, filed 20 Mar. 2020 and European Patent Application No. 20175105.4, filed 15 May 2020.

BACKGROUND

Field

The present invention relates to the crystal forms of methyl(2R*,4R*)-4-[[(5S)-3-(3,5-difluorophenyl)-5-vinyl-4H-isoxazole-5-carbonyl]amino]tetrahydrofuran-2-carboxylate (I) existing in the form of two stereoisomers: Methyl(2R,4R)-4-[[(5S)-3-(3,5-difluorophenyl)-5-vinyl-4H-isoxazole-5-carbonyl]-amino]tetrahydrofuran-2-carboxylate of formula (Ia) and methyl (2S,4S)-4-[[(5S)-3-(3,5-difluoro-phenyl)-5-vinyl-4H-isoxazole-5-carbonyl]amino]tetrahydrofuran-2-carboxylate of formula (Ib), to a method for preparing the crystal forms, to the use for preparing stable agrochemical formulations, and to the use in the field of agriculture for controlling harmful plants.

(Ia)

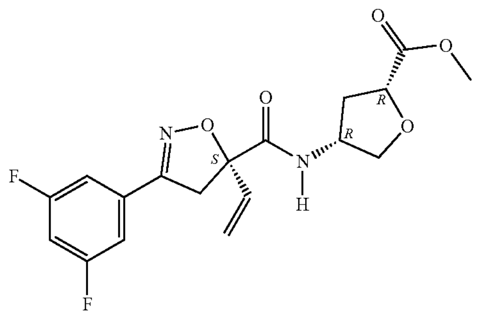

(Ib)

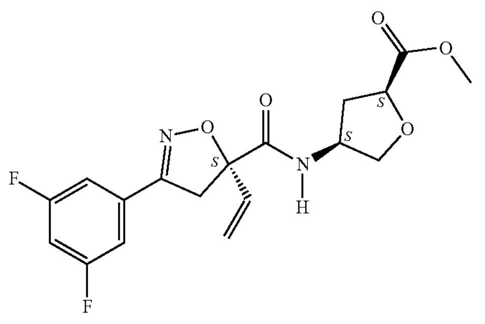

Description of Related Art

Methyl(2R*,4R*)-4-[[(5S)-3-(3,5-difluorophenyl)-5-vinyl-4H-isoxazole-5-carbonyl]amino]tetrahydro-furan-2-carboxylate (I) is a herbicide published in WO2018/228985.

Solid formulations (in which the active ingredient is present in solid form) are of great economic relevance since they have a very good storage stability. These are, for example, granules, encapsulated granules, tablets, water-dispersible granules, water-dispersible tablets, water-dispersible powders or water-dispersible powders for the treatment of seed, dust formulations, formulations in which the active ingredient is present in dispersed form, such as, for example: suspension concentrates (SC), oil-based suspension concentrates, suspoemulsions or suspension concentrates for the treatment of seed.

However, this type of formulation can only be applied if the active ingredient is present in solid form, most preferably in the thermodynamically most stable modification.

Since the ecological and economic requirements placed on modern crop protection agents are continually increasing, for example as regards the action spectrum, activity and application rate, it would be desirable to have available methyl(2R*,4R*)-4-[[(5S)-3-(3,5-difluorophenyl)-5-vinyl-4H-isoxazole-5-carbonyl]amino]tetrahydrofuran-2-carboxylate (I) in a crystalline form which has per se advantages, at least in part areas, compared with the known form or be able to provide the active in a solid formulation which has advantages, at least in part areas.

SUMMARY

Surprisingly, new crystalline forms of Methyl(2R*,4R*)-4-[[(5S)-3-(3,5-difluorophenyl)-5-vinyl-4H-isoxazole-5-carbonyl]amino]tetrahydrofuran-2-carboxylate (I) have now been found which avoid the aforementioned disadvantages of the storage stability as they can be provided in a solid formulation, have improved herbicidal activity compared with the active disclosed in the prior art and improved herbicidal activity of the combination of stereoisomers.

The present invention relates to the crystal forms of methyl(2R*,4R*)-4-[[(5S)-3-(3,5-difluorophenyl)-5-vinyl-4H-isoxazole-5-carbonyl]amino]tetrahydrofuran-2-carboxylate (I) existing in the form of two stereoisomers: Methyl(2R,4R)-4-[[(5S)-3-(3,5-difluorophenyl)-5-vinyl-4H-isoxazole-5-carbonyl]-amino]tetrahydrofuran-2-carboxylate of formula (Ia) and methyl (2S,4S)-4-[[(5S)-3-(3,5-difluorophenyl)-5-vinyl-4H-isoxazole-5-carbonyl]amino]tetrahydrofuran-2-carboxylate of formula (Ib).

BRIEF DESCRIPTION OF THE DRAWINGS

FIGS. 1-4 depict embodiments as described herein.

DETAILED DESCRIPTION OF A PREFERRED EMBODIMENT

After crystallizing methyl(2R*,4R*)-4-[[(5S)-3-(3,5-difluorophenyl)-5-vinyl-4H-isoxazole-5-carbonyl]amino]tetrahydrofuran-2-carboxylate (I) it is separated into the two stereoisomers by chromatography. The crystalline material of the two stereoisomers is characterized for the first time.

The following reflections [peak maxima in °2 theta] (Table 1) are measured for the crystal form of compound of formula (Ia) using Cu Kα radiation at 25° C. (X-ray powder diffractometry).

The following reflections [peak maxima in ° 2 theta] (Table 1) are measured for the crystal form of compound of formula (Ib) using Cu Kα radiation at 25° C. (X-ray powder diffractometry).

TABLE 1

| Reflections (Peak maxima) [°2 Theta]Compound of formula (Ia) | Reflections (Peak maxima) [°2 Theta]Compound of formula (Ib) |
|---|---|
| 4.6 | 7.1 |
| 10.4 | 11.1 |
| 11.9 | 12.0 |
| 12.4 | 14.3 |
| 13.0 | 16.8 |
| 13.2 | 17.1 |
| 13.9 | 17.3 |
| 14.5 | 17.7 |
| 14.8 | 18.4 |
| 15.5 | 18.9 |
| 16.2 | 19.3 |
| 16.5 | 19.7 |
| 16.9 | 20.2 |
| 17.3 | 20.8 |
| 17.6 | 21.3 |
| 18.1 | 21.6 |
| 18.7 | 22.3 |
| 19.3 | 22.7 |
| 19.6 | 23.3 |
| 19.9 | 23.7 |
| 20.1 | 24.0 |
| 20.4 | 24.6 |
| 20.9 | 25.0 |
| 21.3 | 26.0 |
| 21.4 | 26.5 |
| 22.0 | 26.9 |
| 22.6 | 27.4 |
| 22.7 | 27.7 |
| 23.0 | 28.0 |
| 23.6 | 28.8 |
| 23.9 | 29.3 |
| 24.6 | 29.6 |
| 26.6 | 31.1 |
| 26.8 | 31.4 |
| 26.9 | 32.2 |
| 27.3 | 32.7 |
| 27.4 | 33.5 |
| 28.8 | 34.9 |
| 29.0 | 35.2 |
| 29.3 | 35.6 |
| 29.5 | 35.9 |
| 29.8 | 37.2 |
| 30.1 | 37.8 |
| 31.0 | 39.1 |
| 31.2 | |
| 31.4 | |
| 32.4 | |
| 32.8 | |
| 34.1 | |
| 35.1 | |
| 35.5 | |
| 35.8 | |
| 36.6 | |
| 37.4 | |
| 39.2 | |

The crystal form of compound of formula (Ia) is characterized in that the X-ray powder diffractogram using Cu Kα radiation at 25° C. has at least the following reflections: 16,9; 4,6 and 20,9, preferably at least the following reflections: 16,9; 4,6; 20,9; 17,6 and 16,5, more preferably at least the following reflections: 16,9; 4,6; 20,9; 17,6; 16,5; 28,0 and 14,5, most preferably at least the following reflections: 16,9; 4,6; 20,9; 17,6; 16,5; 28,0; 14,5; 22,0; 23,6 and 19,6, each quoted as 2θ value±0.2°.

The crystal form of compound of formula (Ib) is characterized in that the X-ray powder diffractogram using Cu Kα radiation at 25° C. has at least the following reflections: 7,1; 11,1 and 23,7, preferably at least the following reflections: 7,1; 11,1; 23,7; 24,0 and 17,1, more preferably at least the following reflections: 7,1; 11,1; 23,7; 24,0; 17,1; 17,7 and 21,6, most preferably at least the following reflections: 7,1; 11,1; 23,7; 24,0; 17,1; 17,7; 21,6; 20,8; 24,6 and 19,3, each quoted as 2θ value±0.2°.

The crystal form of compound of formula (Ia) is particularly preferably characterized in that the X-ray powder diffractogram using Cu Kα radiation at 25° C. corresponds essentially to the diffractogram shown in FIG. 1.

The crystal form of compound of formula (Ib) is particularly preferably characterized in that the X-ray powder diffractogram using Cu Kα radiation at 25° C. corresponds essentially to the diffractogram shown in FIG. 2.

The crystal form of compound of formula (Ia) as well as the crystal form of compound of formula (Ib) can be characterized by Raman spectroscopy on the basis of the respective spectrum, which are recorded at 25° C. and with a laser wavelength of 1064 nm and a resolution of 2 $cm^{-1}$. The crystal forms according to the present invention display at least 3, often at least 5, in particular at least 7, and especially all of the bands quoted in the following as peak maxima (table 2):

TABLE 2

| Raman Bands [Peak maxima in $cm^{-1}$] Compound of formula (Ia) | Raman Bands [Peak maxima in $cm^{-1}$] Compound of formula (Ib) |
|---|---|
| 3339 | 3343 |
| 3096 | 3103 |
| 3065 | 3081 |
| 3015 | 3063 |
| 2990 | 3034 |
| 2952 | 3016 |
| 2923 | 2993 |
| 2886 | 2968 |
| 2851 | 2957 |
| 1748 | 2941 |
| 1662 | 2887 |
| 1639 | 2855 |
| 1622 | 1756 |
| 1601 | 1655 |
| 1578 | 1637 |
| 1525 | 1621 |
| 1482 | 1611 |
| 1445 | 1584 |
| 1426 | 1528 |
| 1416 | 1480 |
| 1375 | 1439 |
| 1341 | 1402 |
| 1310 | 1374 |
| 1303 | 1334 |
| 1280 | 1312 |
| 1253 | 1296 |
| 1245 | 1284 |
| 1233 | 1270 |
| 1225 | 1254 |
| 1214 | 1226 |
| 1199 | 1212 |
| 1182 | 1197 |
| 1120 | 1188 |
| 1080 | 1137 |
| 1030 | 1119 |
| 1004 | 1102 |
| 982 | 1087 |
| 956 | 1077 |
| 933 | 1071 |
| 915 | 1019 |
| 900 | 1002 |
| 873 | 991 |
| 853 | 972 |
| 842 | 934 |
| 811 | 921 |
| 798 | 900 |
| 761 | 854 |
| 724 | 825 |
| 706 | 810 |

TABLE 2-continued

| Raman Bands [Peak maxima in $cm^{-1}$] Compound of formula (Ia) | Raman Bands [Peak maxima in $cm^{-1}$] Compound of formula (Ib) |
|---|---|
| 673 | 750 |
| 642 | 701 |
| 604 | 678 |
| 596 | 650 |
| 536 | 608 |
| 507 | 594 |
| 493 | 583 |
| 473 | 557 |
| 450 | 536 |
| 440 | 511 |
| 410 | 495 |
| 380 | 467 |
| 355 | 422 |
| 346 | 385 |
| 326 | 358 |
| 303 | 330 |
| 267 | 288 |
| 238 | 261 |
| 202 | 247 |
| 173 | 235 |
| 69 | 196 |
| | 145 |
| | 114 |

The crystal form of compound of formula (Ia) is characterized by the following bands: 1002, 1611 and 1621, preferably at least the following bands: 96, 1004, 1622, 1601 and 1578, more preferably at least the following bands: 96, 1004, 1622, 1601, 1578, 1375 and 267, most preferably at least the following bands: 96, 1004, 1622, 1601, 1578, 1375, 267 2952, 3015 and 3096.

The Raman spectrum is shown in FIG. 3.

The crystal form of compound of formula (Ib) is characterized by the following bands: 96, 1004 and 1622, preferably at least the following bands: 1002, 1611, 1621, 1374 and 261, more preferably at least the following bands: 1002, 1611, 1621, 1374, 261, 1296 and 1212, most preferably at least the following bands: 1002, 1611, 1621, 1374, 261, 1296,1212, 2957, 1968 and 2941.

The Raman spectrum is shown in FIG. 4.

Performing thermomicroscopy with compound of formula (Ia) two metastable modifications can be observed. One has a melting point at 130° C. and the other at 152° C.

Stereoisomers often show differences in biological activity. The two isolated crystalline stereoisomers methyl(2R,4R)-4-[[(5S)-3-(3,5-difluorophenyl)-5-vinyl-4H-isoxazole-5-carbonyl]amino]-tetrahydro-furan-2-carboxylate of formula (Ia) and methyl(2S,4S)-4-[[(5S)-3-(3,5-difluorophenyl)-5-vinyl-4H-isoxazole-5-carbonyl]amino]-tetrahydrofuran-2-carboxylate of formula (Ib) show—as expected—differences in herbicidal activity. Methyl(2R,4R)-4-[[(5S)-3-(3,5-difluorophenyl)-5-vinyl-4H-isoxazole-5-carbonyl]amino]-tetrahydrofuran-2-carboxylate of formula (Ia) is superior in activity compared to methyl(2S,4S)-4-[[(5S)-3-(3,5-difluorophenyl)-5-vinyl-4H-isoxazole-5-carbonyl]amino]-tetrahydrofuran-2-carboxylate of formula (Ib) (see tables 3 to 6).

Comparative testing of the crystalline compounds of formula (I), (Ia) and (Ib) unexpectedly shows that the physical mixture consisting of (Ia) and (Ib) namely (methyl (2R*,4R*)-4-[[(5S)-3-(3,5-difluoro-phenyl)-5-vinyl-4H-isoxazole-5-carbonyl]amino]tetrahydrofuran-2-carboxylate) (I) is superior in herbicidal activity compared to methyl(2R,4R)-4-[[(5S)-3-(3,5-difluorophenyl)-5-vinyl-4H-isoxazole-5-carbonyl]amino]-tetrahydrofuran-2-carboxylate of formula (Ia) which is superior in herbicidal activity compared to methyl(2S,4S)-4-[[(5S)-3-(3,5-difluorophenyl)-5-vinyl-4H-isoxazole-5-carbonyl]amino]-tetrahydrofuran-2-carboxylate of formula (Ib). The physical mixture consisting of (Ia) and (Ib) namely (methyl(2R*,4R*)-4-[[(5 S)-3-(3,5-difluorophenyl)-5-vinyl-4H-isoxazole-5-carbonyl]amino] tetrahydrofuran-2-carboxylate (I) shows a synergistic effect (see tables 3 to 6).

(I), (Ia) and (Ib) according to the present invention have an outstanding herbicidal activity against a broad spectrum of economically important harmful monocotyledonous and dicotyledonous plants.

Specifically, examples may be mentioned of some representatives of the monocotyledonous and dicotyledonous weed flora which can be controlled by (I), (Ia) and (Ib) according to the present invention, without the enumeration being a restriction to certain species.

In the context of the present text, reference may be made to growth stages according to the BBCH monograph "Growth stages of mono- and dicotyledonous plants", $2^{nd}$ edition, 2001, ed. Uwe Meier, Federal Biological Research Centre for Agriculture and Forestry (Biologische Bundesanstalt für Land and Forstwirtschaft).

Examples of monocotyledonous harmful plants on which (I), (Ia) and (Ib) according to the present invention act efficiently are from amongst the genera *Hordeum* spp., *Echinochloa* spp., *Poa* spp., *Bromus* spp., *Digitaria* spp., *Eriochloa* spp., *Setaria* spp., *Pennisetum* spp., *Eleusine* spp., *Eragrostis* spp., *Panicum* spp., *Lolium* spp., *Alopecurus* sp., *Apera* sp. *Brachiaria* spp., *Leptochloa* spp., *Avena* spp., *Cyperus* spp., *Axonopris* spp., *Sorghum* spp., and *Melinus* spp.

Particular examples of monocotyledonous harmful plants species on which (I), (Ia) and (Ib) according to the present invention act efficiently are selected from amongst the species *Hordeum murinum, Echinochloa crus-galli, Poa annua, Bromus rubens* L., *Bromus rigidus, Bromus secalinus* L., *Digitaria insularis, Digitaria sanguinalis, Eriochloa gracilis, Setaria faberi, Setaria viridis, Pennisetum glaucum, Eleusine indica, Eragrostis pectinacea, Panicum miliaceum, Lolium* sp., *Brachiaria platyphylla, Leptochloa fusca, Avena fatua, Cyperus compressus, Cyperus esculentes, Axonopris offinis, Sorghum halapense, Alopecurus myosuroides, Apera spica-venti* and *Melinus repens.*

Examples of dicotyledonous harmful plants on which (I), (Ia) and (Ib) according to the present invention act efficiently are from amongst the genera *Amaranthus* spp., *Polygonum* spp., *Medicago* spp., *Mollugo* spp., *Cyclospermum* spp., *Stellaria* spp., *Gnaphalium* spp., *Taraxacum* spp., *Oenothera* spp., *Amsinckia* spp., *Erodium* spp., *Erigeron* spp., *Senecio* spp., *Lamium* spp., *Kochia* spp., *Chenopodium* spp., *Lactuca* spp., *Malva* spp., *Ipomoea* spp., *Brassica* spp., *Sinapis* spp., *Urtica* spp., *Sida* spp, *Portulaca* spp., *Richardia* spp., *Ambrosia* spp., *Calandrinia* spp., *Sisymbrium* spp., *Sesbania* spp., *Capsella* spp., *Sonchus* spp., *Euphorbia* spp., *Helianthus* spp., *Coronopus* spp., *Salsola* spp., *Abutilon* spp., *Vicia* spp., *Epilobium* spp., *Cardamine* spp., *Picris* spp., *Trifolium* spp., *Galinsoga* spp., *Epimedium* spp., *Marchantia* spp., *Solanum* spp., *Oxalis* spp., *Metricaria* spp., *Plantago* spp., *Tribulus* spp., *Cenchrus* spp. *Bidens* spp., *Veronica* spp., and *Hypochaeris* spp.

Particular examples of dicotyledonous harmful plants species on which (I), (Ia) and (Ib) according to the present invention act efficiently are selected from amongst the species *Amaranthus spinosus, Amaranthus palmer, Amaranthis rudis, Polygonum convolvulus, Medicago polymorpha, Mollugo verticillata, Cyclospermum leptophyllum,*

*Stellaria media, Gnaphalium purpureum, Taraxacum officinale, Oenothera laciniata, Amsinckia intermedia, Erodium cicutarium, Erodium moschatum, Erigeron bonariensis, Senecio vulgaris, Lamium* sp., *Erigeron canadensis, Polygonum aviculare, Kochia scoparia, Chenopodium album, Lactuca serriola, Malva parviflora, Malva neglecta, Ipomoea hederacea, Ipomoea lacunose, Brassica nigra, Sinapis arvensis, Urtica dioica, Amaranthus blitoides, Amaranthus retroflexus, Amaranthus hybridus, Amaranthus lividus, Sida spinosa, Portulaca oleracea, Richardia scabra, Ambrosia artemisiifolia, Calandrinia caulescens, Sisymbrium irio, Sesbania exaltata, Capsella bursa-pastoris, Sonchus oleraceus, Euphorbia maculate, Helianthus annuus, Coronopus didymus, Salsola tragus, Abutilon theophrasti, Vicia benghalensis* L., *Epilobium paniculatum, Cardamine* spp, *Picris echioides, Trifolium* spp., *Galinsoga* spp., *Epimedium* spp., *Marchantia* spp., *Solanum* spp., *Oxalis* spp., *Matricaria chamomilla, Plantago* spp., *Tribulus terrestris, Salsola kali, Cenchrus* spp., *Bidens bipinnata, Veronica* sp., *Galium aparine* L., *Papaver rhoeas, Viola arvense, Centaurea cyanus* and *Hypochaeris radicata.*

(I), (Ia) and (Ib) used according to the present invention are applied once, twice or three times per Gregorian calendar year, i.e. in one application, in two applications or in three applications per year according to the Gregorian calendar.

In a preferred embodiment the present invention relates to the use of the crystal forms of methyl(2R*,4R*)-4-[[(5S)-3-(3,5-difluorophenyl)-5-vinyl-4H-isoxazole-5-carbonyl]amino]tetrahydrofuran-2-carboxylate (I) existing in the form of two stereoisomers: Methyl(2R,4R)-4-[[(5S)-3-(3,5-difluorophenyl)-5-vinyl-4H-isoxazole-5-carbonyl]-amino]tetrahydrofuran-2-carboxylate of formula (Ia) and methyl (2S,4S)-4-[[(5S)-3-(3,5-difluorophenyl)-5-vinyl-4H-isoxazole-5-carbonyl]amino]tetrahydrofuran-2-carboxylate of formula (Ib) in the field of agriculture for controlling harmful plants and the use for combatting unwanted plant growth in crops of useful plants.

In another preferred embodiment the present invention relates to the use of the crystal forms of methyl(2R*,4R*)-4-[[(5S)-3-(3,5-difluorophenyl)-5-vinyl-4H-isoxazole-5-carbonyl]amino]tetrahydrofuran-2-carboxylate (I) existing in the form of two stereoisomers: Methyl(2R,4R)-4-[[(5S)-3-(3,5-difluorophenyl)-5-vinyl-4H-isoxazole-5-carbonyl]-amino]tetrahydrofuran-2-carboxylate of formula (Ia) and methyl (2S,4S)-4-[[(5S)-3-(3,5-difluorophenyl)-5-vinyl-4H-isoxazole-5-carbonyl]amino]tetrahydrofuran-2-carboxylate of formula (Ib) for combatting unwanted plant growth in crops of useful plants.

In another preferred embodiment the present invention relates to a plant protection agent containing the crystal forms of methyl(2R*,4R*)-4-[[(5S)-3-(3,5-difluorophenyl)-5-vinyl-4H-isoxazole-5-carbonyl]amino]tetrahydrofuran-2-carboxylate (I) existing in the form of two stereoisomers: Methyl(2R,4R)-4-[[(5S)-3-(3,5-difluorophenyl)-5-vinyl-4H-isoxazole-5-carbonyl]-amino]tetrahydrofuran-2-carboxylate of formula (Ia) and methyl (2S,4S)-4-[[(5S)-3-(3,5-difluorophenyl)-5-vinyl-4H-isoxazole-5-carbonyl]amino]tetrahydrofuran-2-carboxylate of formula (Ib) and may further comprises one or more agriculturally acceptable additives customary for the formulation of plant protection agents.

Compounds of formula (I), (Ia) and (Ib) according to the present invention can be formulated in various ways, depending on the prevailing biological and/or chemical-physical parameters. The following are examples of general possibilities for formulations:

wettable powders (WP), water-soluble powders (SP), water-soluble concentrates, sprayable solutions, suspension concentrates (SC), oil- or water-based dispersions, oil-miscible solutions, capsule suspensions (CS), dusting products (DP), seed-dressing products, granules for scattering and soil application, granules (GR) in the form of microgranules, spray granules, coated granules and adsorption granules, water-dispersible granules (WG), water-soluble granules (SG), ULV formulations, microcapsules and waxes.

Preferred are solid formulations (in which the active ingredient is present in solid form), for example, granules, encapsulated granules, tablets, water-dispersible granules, water-dispersible tablets, water-dispersible powders or water-dispersible powders for the treatment of seed, dust formulations, formulations in which the active ingredient is present in dispersed form, such as, for example: suspension concentrates (SC), oil-based suspension concentrates, suspoemulsions or suspension concentrates for the treatment of seed.

These individual formulation types are known in principle and are described, for example, in: Winnacker-Küchler, "Chemische Technologie" [Chemical Technology], volume 7, C. Hanser Verlag Munich, 4th ed. 1986; Wade van Valkenburg, "Pesticide Formulations", Marcel Dekker, N.Y., 1973; K. Martens, "Spray Drying" Handbook, 3rd ed. 1979, G. Goodwin Ltd. London.

The formulation auxiliaries required, such as inert materials, surfactants, solvents and further additives, are likewise known and are described, for example, in: Watkins, "Handbook of Insecticide Dust Diluents and Carriers", 2nd ed., Darland Books, Caldwell N.J.; H.v. Olphen, "Introduction to Clay Colloid Chemistry", 2nd ed., J. Wiley & Sons, N.Y.; C. Marsden, "Solvents Guide", 2nd ed., Interscience, N.Y. 1963; McCutcheon's "Detergents and Emulsifiers Annual", MC Publ. Corp., Ridgewood N.J.; Sisley and Wood, "Encyclopedia of Surface Active Agents", Chem. Publ. Co. Inc., N.Y. 1964; Schönfeldt, "Grenzflächenaktive Äthylenoxidaddukte" [Interface-active Ethylene Oxide Adducts], Wiss. Verlagsgesellschaft, Stuttgart 1976; Winnacker-Küchler, "Chemische Technologie" [Chemical Technology], volume 7, C. Hanser Verlag Munich, 4th ed. 1986.

Wettable powders are preparations which can be dispersed uniformly in water and, in addition to the active ingredient, apart from a diluent or inert substance, also comprise surfactants of the ionic and/or nonionic type (wetting agents, dispersants), for example polyoxyethylated alkylphenols, polyoxyethylated fatty alcohols, polyoxyethylated fatty amines, fatty alcohol polyglycol ether sulphates, alkanesulphonates, alkylbenzenesulphonates, sodium lignosulphonate, sodium 2,2'-dinaphthylmethane-6,6'-disulphonate, sodium dibutylnaphthalenesulphonate or else sodium oleoylmethyltaurate. To produce the wettable powders, the herbicidally active ingredients are finely ground, for example in customary apparatus such as hammer mills, blower mills and air-jet mills, and simultaneously or subsequently mixed with the formulation auxiliaries.

Dustable powders are obtained by grinding the active ingredient with finely distributed solid substances, for example talc, natural clays such as kaolin, bentonite and pyrophyllite, or diatomaceous earth.

Suspension concentrates may be water- or oil-based. They may be prepared, for example, by wet-grinding by means of commercial bead mills and optional addition of surfactants as have, for example, already been listed above for the other formulation types.

Granules can be prepared either by spraying the active ingredient onto adsorptive granular inert material or by applying active ingredient concentrates to the surface of carriers, such as sand, kaolinites or granular inert material, by means of adhesives, for example polyvinyl alcohol, sodium polyacrylate or else mineral oils. Suitable active ingredients can also be granulated in the manner customary for the production of fertilizer granules—if desired as a mixture with fertilizers.

Water-dispersible granules are produced generally by the customary processes such as spray-drying, fluidized bed granulation, pan granulation, mixing with high-speed mixers and extrusion without solid inert material.

For the production of pan granules, fluidized bed granules, extruder granules and spray granules, see, for example, processes in "Spray-Drying Handbook" 3rd ed. 1979, G. Goodwin Ltd., London; J. E. Browning, "Agglomeration", Chemical and Engineering 1967, pages 147 ff.; "Perry's Chemical Engineer's Handbook", 5th ed., McGraw-Hill, New York 1973, pp. 8-57.

For further details regarding the formulation of crop protection compositions, see, for example, G. C. Klingman, "Weed Control as a Science", John Wiley and Sons, Inc., New York, 1961, pages 81-96 and J. D. Freyer, S. A. Evans, "Weed Control Handbook", 5th ed.

The present invention therefore also provides a method for controlling harmful plants and/or for regulating the growth of plants, characterized in that an effective amount of the crystal forms of compound of formula (I), (Ia), (Ib) or any mixture thereof, or an agrochemical formulation according to the invention, as defined above, is applied to the plants, seeds of plants, the soil in which or on which the plants grow or the area under cultivation.

EXAMPLES

1. Preparation

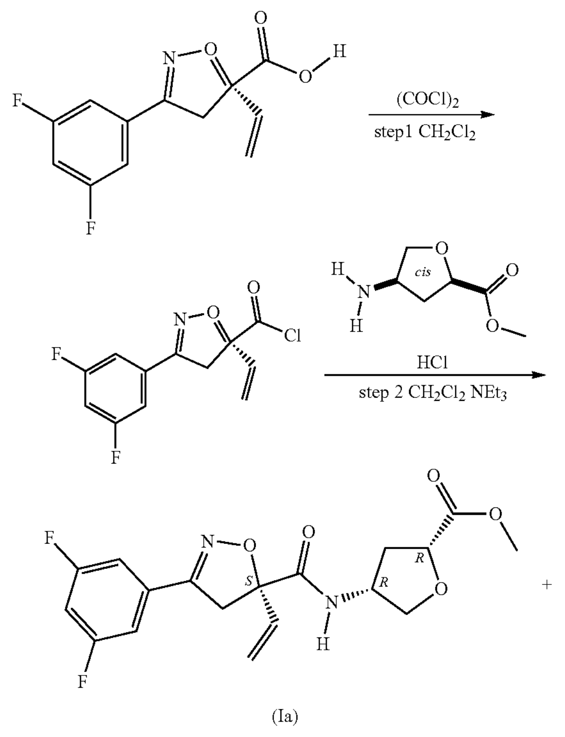

+

(Ia)

-continued

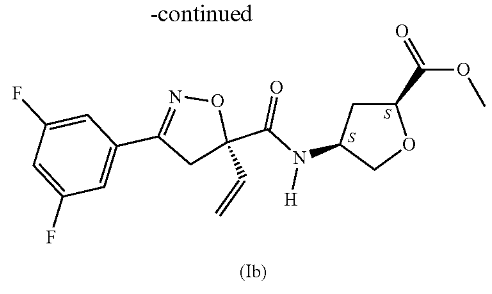

(Ib)

Preparation of Compound of Formula (I), (Ia) and (Ib)

Step 1: (5S)-3-(3,5-Difluorophenyl)-5-vinyl-4H-isoxazol-5-carbonylchloride

To 2.70 g (10.6 mmol) (5S)-3-(3,5-difluorophenyl)-5-vinyl-4H-isoxazol-5-carboxylic acid suspended in 45 mL dichloromethane three drops of dimethylformamide (DMF) were added. Then 2.03 g (15.9 mmol) oxalylchloride were added dropwise. Evolution of gas was observed. The mixture was stirred for 6 h at room temperature and afterwards volatile components were removed under vacuum. The crude product was used in the next step without further purification.

Step 2: Methyl(2R*,4R*)-4-[[(5S)-3-(3,5-difluorophenyl)-5-vinyl-4H-isoxazole-5-carbonyl]-amino]tetrahydrofuran-2-carboxylate (compound of formula (I))

To 262 mg (1.44 mmol) methyl-cis-4-aminotetrahydrofuran-2-carboxylicacid hydrochloride suspended in 5 ml dichloromethane were added 292 mg (2.88 mmol) triethylamine. To this reaction mixture a solution of 250 mg (0.96 mmol) (5S)-3-(3,5-difluorphenyl)-5-vinyl-4H-isoxazol-5-carbonylchloride dis-solved in 6 ml dichloromethane was added at 0° C. After warming up to room temperature the reaction mixture was stirred for 6 h. For workup water was added, the organic layer was separated, dried with $Na_2SO_4$ filtered and evaporated under vacuum. The crude product was purified by chromatography using silicagel as stationary phase followed by evaporation of the solvent. N-heptane was added to the residue and the resulting crystals were filtered off. Yield 75 mg (21%).

$^1$H-NMR (400.0 MHz, $CDCl_3$):

δ=7.262 (28.6); 7.180 (2.2); 7.174 (2.6); 7.171 (1.5); 7.163 (1.5); 7.160 (2.6); 7.154 (2.1); 6.903 (0.8); 6.887 (0.9); 6.882 (1.6); 6.876 (0.8); 6.860 (0.8); 6.176 (2.0); 6.150 (2.3); 6.133 (2.4); 6.106 (2.5); 5.560 (1.8); 5.558 (1.8); 50.544 (1.7); 5.543 (1.7); 5.517 (1.5); 5.515 (1.5); 5.501 (1.5); 5.500 (1.4); 5.357 (1.6); 5.356 (1.6); 5.343 (1.5); 5.342 (1.5); 5.330 (1.5); 5.329 (1.5); 5.316 (1.4); 5.315 (1.4); 5.299 (9.2); 4.603 (0.5); 4.596 (0.6); 4.591 (0.6); 4.585 (0.6); 4.579 (0.6); 4.574 (1.1); 4.565 (1.2); 4.558 (1.1); 4.550 (1.4); 4.542 (0.9); 4.534 (0.9); 4.525 (0.8); 4.056 (0.8); 4.043 (0.9); 4.041 (0.9); 4.033 (1.3); 4.028 (0.8); 4.020 (1.3); 4.017 (1.4); 4.004 (1.1); 3.950 (0.7); 3.946 (0.7); 3.944 (0.7); 3.929 (1.1); 3.922 (2.7); 3.905 (0.5); 3.899 (2.3); 3.878 (2.2); 3.856 (2.2); 3.814 (15.9); 3.800 (16.0); 3.322 (1.9); 3.313 (1.9); 3.279 (1.6); 3.270 (1.7); 2.566 (0.5); 2.564 (0.5); 2.555 (0.6); 2.549 (0.5); 2.546 (0.5); 2.540 (0.6); 2.538 (0.6); 2.531 (0.6);

2.529 (0.6); 2.514 (0.5); 2.511 (0.6); 2.094 (0.6); 2.060 (0.5); 2.052 (0.5); 2.044 (0.6); 1.577 (5.9); 0.000 (11.4)

The preparation of methyl-cis-4-aminotetrahydrofuran-2-carboxylicacid hydrochloride is known from G. R. Ott et al.; *Bioorg. Med. Chem. Lett.* 2008, 694-699.

The product methyl(2R*,4R*)-4-[[(5S)-3-(3,5-difluorophenyl)-5-vinyl-4H-isoxazole-5-carbonyl]amino]tetrahydrofuran-2-carboxylate) (I) was separated into methyl(2R, 4R)-4-[[(5S)-3-(3,5-difluorophenyl)-5-vinyl-4H-isoxazole-5-carbonyl]amino]-tetrahydrofuran-2-carboxylate of formula (Ia) and methyl(2S,4S)-4-[[(5S)-3-(3,5-difluorophenyl)-5-vinyl-4H-isoxazole-5-carbonyl]amino]-tetrahydrofuran-2-carboxylate of formula (Ib) applying standard chromatography. After evaporating the solvent compound of formula (Ia) and (Ib) are received as crystalline material.

NMR Data of Compound of Formula (Ia)

$^1$H-NMR (400.6 MHz, $CDCl_3$):

δ=7.494 (0.6); 7.474 (0.6); 7.278 (0.9); 7.184 (1.5); 7.178 (2.0); 7.176 (1.4); 7.167 (1.3); 7.164 (2.0); 7.159 (1.7); 6.906 (0.6); 6.890 (0.7); 6.884 (1.3); 6.879 (0.7); 6.863 (0.6); 6.180 (1.1); 6.153 (1.2); 6.137 (1.4); 6.110 (1.4); 5.560 (2.2); 5.559 (2.2); 5.516 (1.9); 5.516 (1.9); 5.358 (2.1); 5.331 (2.0); 4.622 (0.5); 4.615 (0.6); 4.611 (0.6); 4.608 (0.6); 4.602 (0.6); 4.597 (0.6); 4.562 (1.0); 4.553 (1.2); 4.539 (1.2); 4.530 (1.1); 4.060 (0.9); 4.047 (1.0); 4.036 (1.5); 4.023 (1.4); 3.955 (1.1); 3.951 (1.2); 3.928 (2.9); 3.885 (2.5); 3.801 (16.0); 3.322 (2.3); 3.279 (2.0); 2.569 (0.5); 2.551 (0.6); 2.546 (0.6); 2.534 (0.7); 2.528 (0.6); 2.517 (0.7); 2.511 (0.7); 2.493 (0.6); 2.056 (0.5); 2.050 (0.8); 2.043 (0.6); 2.015 (0.8); 2.009 (0.5); 0.000 (0.8)

NMR Data of Compound of Formula (Ib)

$^1$H-NMR (400.6 MHz, $CDCl_3$):

δ=7.461 (0.7); 7.442 (0.7); 7.278 (0.9); 7.184 (1.6); 7.178 (2.0); 7.164 (2.1); 7.159 (1.6); 6.907 (0.6); 6.891 (0.8); 6.885 (1.3); 6.880 (0.7); 6.864 (0.7); 6.179 (1.1); 6.152 (1.3); 6.136 (1.4); 6.109 (1.4); 5.543 (2.3); 5.500 (2.0); 5.344 (2.2); 5.317 (2.1); 4.593 (0.6); 4.587 (0.7); 4.579 (1.6); 4.570 (1.8); 4.563 (0.6); 4.555 (1.5); 4.546 (1.2); 4.043 (1.0); 4.030 (1.0); 4.019 (1.6); 4.006 (1.4); 3.935 (1.2); 3.930 (1.2); 3.905 (3.0); 3.862 (2.6); 3.814 (16.0); 3.331 (2.4); 3.288 (2.1); 2.596 (0.5); 2.579 (0.6); 2.573 (0.6); 2.562 (0.7); 2.555 (0.6); 2.544 (0.7); 2.538 (0.7); 2.521 (0.6); 2.107 (0.6); 2.101 (0.9); 2.095 (0.6); 2.073 (0.5); 2.067 (0.8); 2.060 (0.5); 1.257 (0.5); 0.000 (0.8)

The ratio between (Ia) and (Ib) in (I) varies between 1.5 to 0.5 and 0.5 to 1.5.

The difference between Methyl(2R*,4R*)-4-[[(5S)-3-(3,5-difluorophenyl)-5-vinyl-4H-isoxazole-5-carbonyl]amino] tetrahydrofuran-2-carboxylate published in WO2018/228985 and Methyl(2R*,4R*)-4-[[(5S)-3-(3,5-difluorophenyl)-5-vinyl-4H-isoxazole-5-carbonyl]amino] tetrahydrofuran-2-carboxylate (I) according to the present invention is its crystallinity which is published for the first time when applying N-heptane to the crude product (see step 2 of its preparation). The separated stereoisomers are also published as crystalline product for the first time.

2. NMR Peak Lists Procedure $^1$H-NMR data of selected examples are written in form of $^1$H-NMR peak lists. δ-Values in ppm and the signal intensity in round brackets are listed to each signal peak. Semicolons are depicted as delimiters between the δ-value—signal intensity pairs.

Therefore the Peak List of an Example has the Form:

$\delta_1$ (intensity$_1$); $\delta_2$ (intensity$_2$); . . . ; $\delta_i$ (intensity$_i$); . . . ; $\delta_n$ (intensity$_n$)

The intensity of sharp signals correlates with the height of the signals in a printed view of a $^1$H-NMR spectrum in cm and shows the real relations of signal intensities. Several peaks from broad signals or the middle of the signal and their relative intensity in comparison to the most intensive signal in the spectrum can be shown.

Tetramethylsilane or the chemical shift of the solvent in cases where the sample does not contain tetramethylsilane is used for a calibration of the chemical shift for $^1$H spectra. Therefore the tetramethylsilane peak can occur in $^1$H-NMR peak lists, but not necessarily.

$^1$H-NMR peak lists are equivalent to classical $^1$H-NMR prints and contain usually all peaks, which are also listed at classical $^1$H-NMR-interpretations.

In addition, they can show signals of solvents, stereoisomers of the compounds which are optionally object of the invention, and/or peaks of impurities, like classical $^1$H-NMR prints.

$^1$H-NMR solvent signals, the tetramethylsilane signal and the water signal in the corresponding solvent are excluded from the relative intensity calibration as they have very high intensity values.

On average, the peaks of stereoisomers of the compounds according to the invention and/or peaks of impurities have usually a lower intensity than the peaks of compounds according to the invention (for example with a purity >90%).

Such stereoisomers and/or impurities can be typical for the specific preparation process. Thus, the corresponding peaks can help to recognize the reproduction of the preparation process via "side-products-fingerprints".

An expert, who calculates the peaks of the target compounds with known methods (MestreC, ACD-simulation, but also with empirically evaluated expectation values), can assign the peaks of the target compounds as needed, optionally using additional intensity filters. This assignment would be similar to the usual peak picking at classical $^1$H-NMR interpretations.

The used solvent can be extracted from the JCAMP file with the parameter "solvent", the spectrometer frequency with "observe frequency" and the spectrometer type with "spectrometer/data system".

$^{13}$C-NMR data are displayed analogous to $^1$H-NMR data as peak lists from broadband decoupled $^{13}$C-NMR spectra. $^{13}$C-NMR solvent signals and tetramethylsilane are excluded from the relative intensity calibration as these signals can have very high intensities.

Further details of NMR-data description with peak lists are disclosed in the publication "Citation of NMR Peaklist Data within patent applications" of the Research Disclosure Database Number 564025.

3. Characterization of Crystal Forms

Methods

All data which is part of the present application has been prepared according to the methods described below unless otherwise indicated. The samples used for measurement were directly used and did not undergo any further sample preparation.

XRPD

X-Ray diffraction patterns were recorded at room temperature using XRD-diffractometers X'Pert PRO (PANalytical) and STOE STADI-P (radiation Cu K alpha 1, wavelength 1.5406 Å). All X-Ray reflections are quoted as °2θ (theta) values (peak maxima) with a resolution of ±0.2°.

Raman

Raman spectra were recorded at room temperature using FT-Raman-spectrophotometers (model RFS 100 and Multi-Ram) from Bruker. Resolution was 2 $cm^{-1}$. Measurements were performed in glass vials or aluminium discs.

Thermomicroscopy

Axio Scope.A1 and Axioskop 40 (Zeiss) Enlargement: 100× Light: Polarized and normal transmitted light

4. Biological Testing

Methodology of Post-Emergence Treatments

Seeds of grass and broadleaf weeds were sown in pots (diameter: 7 cm) filled with a sandy loam soil. Following germination the plants were grown under optimal conditions up to a growth stage of BBCH 11 to 14 depending on species.

The applications were performed by post emergence treatments on the planted pots using a spray volume of 300 L water per hectare. The herbicides were applied alone and in combination as described.

The trial was conducted in the greenhouse ensuring optimal growing conditions.

The herbicidal effects were assessed 21 days following application by visual ratings comparing treated and untreated plants (0%=no effect to 100%=complete die-off).

The compounds of the formula (Ia), (Ib) and (I) were formulated as WP (wettable powder) formulation.

The Following Abbreviations were Used:

- BBCH=the BBCH code provides information about the morphological development stage of a plant. Officially, the abbreviation denotes the Biologische Bundesanstalt, Bundessortenamt and Chemische Industrie [Federal Biological Institute for Agriculture and Forestry, Federal Office for Crop Plant Varieties and Chemical Industry]. The range of BBCH 00-10 denotes the germination stages of the seeds until surface penetration. The range of BBCH 11-25 denotes the leaf development stages until stocking (corresponding to the number of tillers or side-shoots).

In the Trials, the Following Biotypes of Broad-Leaved Weeds and Weed Grasses were Used:

- ALOMY—sensitive (*Alopecurus myosuroides*) sensitive to customary herbicidally active compounds.
- ALOMY_R (resistant) (*Alopecurus myosuroides*) resistant to herbicidally active compounds of the HRAC groups A and B; population mixture of field origin having increased metabolic resistance (IMR) and some target site resistance (TSR).
- LOLRI—sensitive (*Lolium rigidum*) sensitive to customary herbicidally active compounds.
- LOLRI_R (resistant) (*Lolium rigidum*) resistant to herbicidally active compounds of the HRAC groups A and B; population mixture of field origin having increased metabolic resistance (IMR) and some target site resistance (TSR).
- AMAPA_R (resistant) (*Amaranthus palmeri*) resistant to herbicidally active compounds of the HRAC groups A and B; population mixture of field origin having increased metabolic resistance (IMR) and some target site resistance (TSR).
- CHRVI (*Chloris virgate*) feather finger grass
- KCHSC (*Kochia scoparia*) Mexican burning bush
- MATIN (*Matricaria inodora*) false chamomile
- POLCO (*Polygonum convolvulus*) black knotweed
- ABUTH (*Abutilon theophrasti*) china jute
- AMAPA (*Amaranthus palmeri*) palmer amaranth
- BIDPI (*Bidens pilosa*) common blackjack
- CHEAL (*Chenopodium album*) common lambsquarters
- EPHHL (*Euphorbia heterophylla*) wild spurge
- XANST (*Xanthium strumarium*) large cocklebur
- EMEAU (*Emex australis*)—Cathead
- GALAP (Gallium *aparine*)—Cleaver The synergistic herbicidal activity was calculated using Colby's formula (cf. S. R. Colby; Weeds 15 (1967), 20-22):

According to Colby synergistic effects of herbicidal active ingredients are indicated if the measured efficacy is higher than the expected one calculated according to his formula for 2-way mixtures $$E^C=A+B-(A\times B)/100$$

The Results are Shown in Tables 3 to 6 Below:

TABLE 3

| | g/ha | g/ha | CHRVI | | | EMEAU | | |
|---|---|---|---|---|---|---|---|---|
| Compound | (Ia) | (Ib) | Observed | Expected | Synergism | Observed | Expected | Synergism |
| (Ia) | 50 | 0 | | | | 80 | | |
| | 25 | 0 | | | | | | |
| | 12.5 | 0 | 35 | | | | | |
| | 6.25 | 0 | | | | | | |
| (Ib) | 0 | 50 | | | | 45 | | |
| | 0 | 25 | | | | | | |
| | 0 | 12.5 | 20 | | | | | |
| | 0 | 6.25 | | | | | | |
| (I) | 50 | | | | | | | |
| | 25 | | | | | | | |
| | 12.5 | | 95 | 48 | 47 | 97 | 89 | 8 |
| | 6.25 | | | | | | | |

| | g/ha | g/ha | KCHSC | | | LOLRI | | |
|---|---|---|---|---|---|---|---|---|
| Compound | (Ia) | (Ib) | Observed | Expected | Synergism | Observed | Expected | Synergism |
| (Ia) | 50 | 0 | | | | | | |
| | 25 | 0 | | | | | | |
| | 12.5 | 0 | 70 | | | 90 | | |
| | 6.25 | 0 | | | | 20 | | |
| (Ib) | 0 | 50 | | | | | | |
| | 0 | 25 | | | | | | |
| | 0 | 12.5 | 40 | | | 0 | | |

TABLE 3-continued

| | | | | | | | | |
|---|---|---|---|---|---|---|---|---|
| | 0 | 6.25 | | | | 0 | | |
| | 50 | | | | | | | |
| | 25 | | | | | | | |
| | 12.5 | | 95 | 82 | 13 | 95 | 90 | 5 |
| | 6.25 | | | | | 75 | 20 | 55 |

TABLE 4

| | g/ha | g/ha | LOLRI_R | | | GALAP | | |
|---|---|---|---|---|---|---|---|---|
| Compound | (Ia) | (Ib) | Observed | Expected | Synergism | Observed | Expected | Synergism |
| (Ia) | 50 | 0 | | | | 75 | | |
| | 25 | 0 | 30 | | | | | |
| | 12.5 | 0 | 20 | | | | | |
| | 6.25 | 0 | 15 | | | | | |
| (Ib) | 0 | 50 | | | | 35 | | |
| | 0 | 25 | 0 | | | | | |
| | 0 | 12.5 | 0 | | | | | |
| | 0 | 6.25 | 0 | | | | | |
| (I) | 50 | | | | | 90 | 84 | 6 |
| | 25 | | 40 | 30 | 10 | | | |
| | 12.5 | | 40 | 20 | 20 | | | |
| | 6.25 | | 30 | 15 | 15 | | | |

| | g/ha | g/ha | MATIN | | | POLCO | | |
|---|---|---|---|---|---|---|---|---|
| Compound | (Ia) | (Ib) | Observed | Expected | Synergism | Observed | Expected | Synergism |
| (Ia) | 50 | 0 | 0 | | | | | |
| | 25 | 0 | 0 | | | | | |
| | 12.5 | 0 | 0 | | | 85 | | |
| | 6.25 | 0 | | | | | | |
| (Ib) | 0 | 50 | 0 | | | | | |
| | 0 | 25 | 0 | | | | | |
| | 0 | 12.5 | 0 | | | 40 | | |
| | 0 | 6.25 | | | | | | |
| | 50 | | 20 | 0 | 20 | | | |
| | 25 | | 15 | 0 | 15 | | | |
| | 12.5 | | 15 | 0 | 15 | 95 | 91 | 4 |
| | 6.25 | | | | | | | |

TABLE 5

| | g/ha | g/ha | ABUTH | | | AMAPA-R | | | BID PI | | |
|---|---|---|---|---|---|---|---|---|---|---|---|
| Compound | (Ia) | (Ib) | Observed | Expected | synerg. | Observed | Expected | synerg. | Observed | Expected | synerg. |
| (Ia) | 100 | 0 | | | | | | | | | |
| | 50 | 0 | 60 | | | | | | | | |
| | 25 | 0 | 45 | | | 35 | | | 30 | | |
| (Ib) | 0 | 100 | | | | | | | | | |
| | 0 | 50 | 20 | | | | | | | | |
| | 0 | 25 | 10 | | | 25 | | | 10 | | |
| (I) | 100 | 100 | | | | | | | | | |
| | 50 | 50 | 75 | 68 | 7 | | | | | | |
| | 25 | 25 | 75 | 51 | 25 | 65 | 51 | 14 | 65 | 37 | 28 |

TABLE 6

| | g/ha | g/ha | CHEAL | | | EPHHL | | | XANST | | |
|---|---|---|---|---|---|---|---|---|---|---|---|
| Compound | (Ia) | (Ib) | Observed | Expected | synerg. | Observed | Expected | synerg. | Observed | Expected | synerg. |
| (Ia) | 100 | 0 | | | | | | | 20 | | |
| | 50 | 0 | | | | 35 | | | 20 | | |
| | 25 | 0 | 70 | | | 30 | | | 0 | | |
| (Ib) | 0 | 100 | | | | | | | 20 | | |
| | 0 | 50 | 60 | | | 35 | | | 10 | | |
| | 0 | 25 | 20 | | | 35 | | | 0 | | |

TABLE 6-continued

| | g/ha | g/ha | CHEAL | | | EPHHL | | | XANST | | |
|---|---|---|---|---|---|---|---|---|---|---|---|
| Compound | (Ia) | (Ib) | Observed | Expected | synerg. | Observed | Expected | synerg. | Observed | Expected | synerg. |
| (I) | 100 | 100 | | | | | | | 65 | 36 | 29 |
| | 50 | 50 | | | | 70 | 58 | 12 | 35 | 28 | 7 |
| | 25 | 25 | 95 | 76 | 19 | 65 | 55 | 11 | 35 | 0 | 35 |

The invention claimed is:

1. A method for preparing methyl (2R,4R)-4-[(5S)-3-(3,5-difluorophenyl)-5-vinyl-4H-isoxazole-5-carbonyl]amino]-tetrahydrofuran-2-carboxylate of formula (Ia) and methyl (2S,4S)-4-[[(5S)-3-(3,5-difluorophenyl)-5-vinyl-4H-isoxazole-5-carbonyl]amino]-tetrahydrofuran-2-carboxylate of formula (Ib) in respective crystallized form, (Ia)

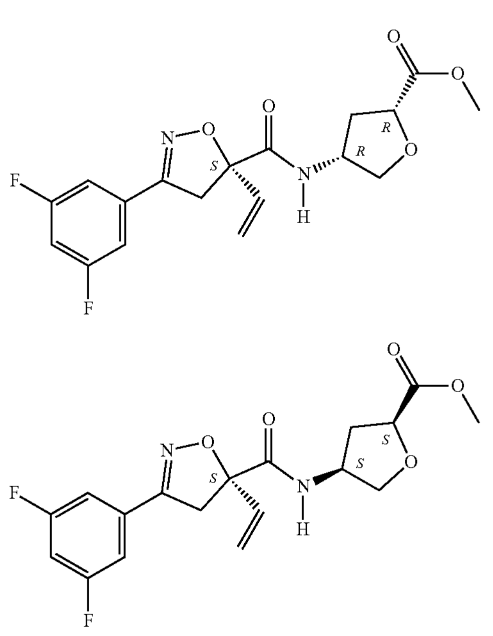

(Ib)

the method comprising:

combining methyl-cis-4-aminotetrahydrofuran-2-carboxylicacid hydrochloride with (5S)-3-(3,5-difluorphenyl)-5-vinyl-4H-isoxazol-5-carbonylchloride to produce methyl (2R*,4R*)-4-[[(5S)-3-(3,5-difluorophenyl)-5-vinyl-4H-isoxazole-5-carbonyl]-amino]tetrahydrofuran-2-carboxylate;

adding N-heptane to the methyl(2R*,4R*)-4-[[(5S)-3-(3,5-difluorophenyl)-5-vinyl-4H-isoxazole-5-carbonyl]-amino]tetrahydrofuran-2-carboxylate to produce crystals of the compounds of formulas (Ia) and (Ib); and separating the crystals of the compounds of formulas (Ia) and (Ib);

wherein the crystals of the compounds of formulas (la) and (Ib) are present in a ratio that is between 1.5 and 0.5, wherein corresponding X-ray powder diffractograms of separated compounds (Ia) and (Ib) using Cu Kα radiation at 25° C. each comprise at least 3 of the following 2θ (2 theta) values:

| Reflections (Peak maxima) [°2 Theta] Compound of formula (Ia) | Reflections (Peak maxima) [°2 Theta] Compound of formula (Ib) |
|---|---|
| 16.9 | 7.1 |
| 4.6 | 11.1 |
| 20.9 | 23.7 |
| 17.6 | 24.0 |
| 16.5 | 17.1 |
| 28.0 | 17.7 |
| 14.5 | 21.6 |
| 22.0 | 20.8 |
| 23.6 | 24.6 |
| 19.6 | 19.3. |

2. The method of claim 1, wherein the corresponding X-ray powder diffractograms of separated compounds (Ia) and (Ib), using Cu Kα radiation at 25° C. each comprise at least 4 of the 2θ (2 theta) values.

3. The method of claim 2, wherein the X-ray powder diffractograms of separated compounds (Ia) and (Ib), using Cu Kα radiation at 25° C. each comprises at least 6 of the 2θ (2 theta) values.

4. The method of claim 3, wherein the X-ray powder diffractograms of separated compounds (Ia) and (Ib), using Cu Kα radiation at 25° C. each comprises all of the 2θ (2 theta) values.

5. A plant protection agent comprising methyl (2R,4R)-4-[(5S)-3-(3,5-difluorophenyl)-5-vinyl-4H-isoxazole-5-carbonyl]amino]-tetrahydrofuran-2-carboxylate of formula (Ia) and methyl (2S,4S)-4-[[(5S)-3-(3,5-difluorophenyl)-5-vinyl-4H-isoxazole-5-carbonyl]amino]-tetrahydrofuran-2-carboxylate of formula (Ib) in respective crystallized form and prepared according to claim 1.

6. The plant protection agent according to claim 5, which further comprises one or more agriculturally acceptable additives customary for formulation of one or more plant protection agents.

7. A product comprising methyl (2R,4R)-4-[(5S)-3-(3,5-difluorophenyl)-5-vinyl-4H-isoxazole-5-carbonyl]amino]-tetrahydrofuran-2-carboxylate of formula (Ia) and methyl (2S,4S)-4-[[(5S)-3-(3,5-difluorophenyl) vinyl-4H-isoxazole-5-carbonyl]amino]-tetrahydrofuran-2-carboxylate of formula (Ib) in respective crystallized form and prepared according to claim 1.

8. A method for combating undesired plant growth, comprising applying, to one or more plants, methyl (2R,4R)-4-[(5S)-3-(3,5-difluorophenyl)-5-vinyl-4H-isoxazole-5-carbonyl]amino]-tetrahydrofuran-2-carboxylate of formula (Ia) and methyl (2S,4S)-4-[[(5S)-3-(3,5-difluorophenyl)-5-vinyl-4H-isoxazole-5-carbonyl]amino]-tetrahydrofuran-2-carboxylate of formula (Ib) in respective crystallized form and prepared according to claim 1.

* * * * *